United States Patent [19]

Shai

[11] 4,084,328

[45] Apr. 18, 1978

[54] METHOD OF ADJUSTING ANGULARITY OF LIGHT FIXTURES

[75] Inventor: Arthur S. Shai, Fayetteville, N.Y.

[73] Assignee: Jaquith Industries, Inc., Syracuse, N.Y.

[21] Appl. No.: 744,428

[22] Filed: Nov. 23, 1976

Related U.S. Application Data

[62] Division of Ser. No. 617,182, Sep. 26, 1975, abandoned.

[51] Int. Cl.² .................................... G01C 9/00

[52] U.S. Cl. .................................... 33/368; 33/391

[58] Field of Search .................... 33/368, 370, 371, 391, 33/180 R

[56] References Cited

U.S. PATENT DOCUMENTS

| | | | |
|---|---|---|---|
| 532,515 | 1/1895 | Woodworth | 33/368 |
| 1,120,737 | 12/1914 | Nielsen | 33/368 |
| 2,326,518 | 8/1943 | Beatty | 33/391 |
| 2,593,141 | 4/1952 | Hagner | 33/368 X |
| 2,786,279 | 3/1957 | Hughes | 33/368 |
| 2,877,561 | 3/1959 | Morse | 33/368 |
| 3,336,679 | 8/1967 | Davis | 33/368 X |
| 3,429,052 | 2/1969 | Hembd et al. | 33/368 X |

*Primary Examiner*—Charles E. Phillips
*Attorney, Agent, or Firm*—Charles S. McGuire

[57] ABSTRACT

A method of adjustment, by use of a gravity-operated angle measuring device, of the azimuth and/or elevation of the major axis of a light fixture having a normal operating position located at an inaccessible height, as on a tower holding runway approach lights. The method includes lowering the tower by rotating it about its base to a position wherein the light fixtures are accessible; measuring the vertical angle of the tower axis in the lowered position; adjusting the fixture to the desired angle relative to the tower axis by attaching the measuring device directly to the fixture; elevating the tower with the device still attached to the fixture; locking the angle shown on the device in the elevated position of the tower; again lowering the tower to read the angle locked on the device; and making any necessary adjustment of the light fixture axis relative to the tower axis so that the axis of a beam emanating from the fixture is directed at a predetermined azimuth and elevation.

6 Claims, 14 Drawing Figures

METHOD OF ADJUSTING ANGULARITY OF LIGHT FIXTURES

REFERENCE TO RELATED APPLICATION

This is a division of copending U.S. application Ser. No. 617,182, filed Sept. 26, 1975, now abandoned.

BACKGROUND OF THE INVENTION

The present invention relates to measurement of vertical angles and, more particularly, to a method of adjusting structure such as lighting fixtures mounted on towers to a desired light beam axis.

Runway approach lights are commonly mounted on towers in order to be placed at a desired elevation relative to the runway surface. It is also necessary that the individual beams of light be directed along an axis having a specific azimuth and elevation in order to be properly oriented with respect to the flight path of approaching aircraft. Adjustment of the lamp fixtures in their normal operating position is difficult because they are located at a height which is inaccessible from the ground. The towers are usually too fragile for climbing and the use of ladders, or the like, is also impractical or inconvenient.

Accordingly, it is necessary to adjust the position of the light bulbs or fixtures before the tower is erected to its operative position. Construction and mounting of the towers is such that the vertical angle of the major axis of the tower in the erected position is not precisely known. Therefore, adjustment of the light fixture relative to the tower axis with the tower in a lowered position will not necessarily result in a desired vertical angle of the light beam axis when the tower is erected.

The principal object of the invention is to provide a novel and highly accurate method of adjusting the angularity of a light source having an operative position normally inaccessible from ground level.

Another object is to provide a method of determining the vertical angle of an axis of an adjustable element when the element is in a position where direct reading of the angle is not practical.

Other objects will in part be obvious and will in part appear hereinafter.

SUMMARY OF THE INVENTION

The method of the invention is concerned with adjustment of runway approach lights mounted on towers at a height inaccessible from ground level. The top of the tower is lowered by rotating the entire structure about a horizontal axis through its base to a position wherein the portion carrying the light fixtures is accessible from ground level. The angle of repose of the tower, i.e., the vertical angle of the member supporting the light fixtures when in the lowered position, is measured by attaching a gravity-operated angle measuring device thereto. The device is then attached to the light fixture itself by an appropriate threaded or tapped adapter so that the angle reflected on the device is the vertical angle of the axis of the fixture. This angle is adjusted relative to that of the member supporting the fixture to a position reflecting the desired angle when the tower is erected, assuming the supporting member to then be vertical. The tower is erected with the device still attached to the fixture. The device is allowed to come to an equilibrium position, reflecting the actual vertical angle of the fixture axis in the operative position, and locked by a friction brake. The tower is then lowered again, the angle showing on the device is read, any necessary correctional adjustment of the fixture is made, the device is removed and replaced by the light bulb, and the tower is again erected and bolted in place. A method is disclosed for adjusting multiple fixtures at spaced positions on a bar at the top of the tower, as well as those of the single light fixture type. Although the device itself is not the subject of this application, a preferred construction thereof will be described in some detail since certain features of its operation are essential in performing the steps of the invention claimed herein.

DETAILED DESCRIPTION

Figure 1:
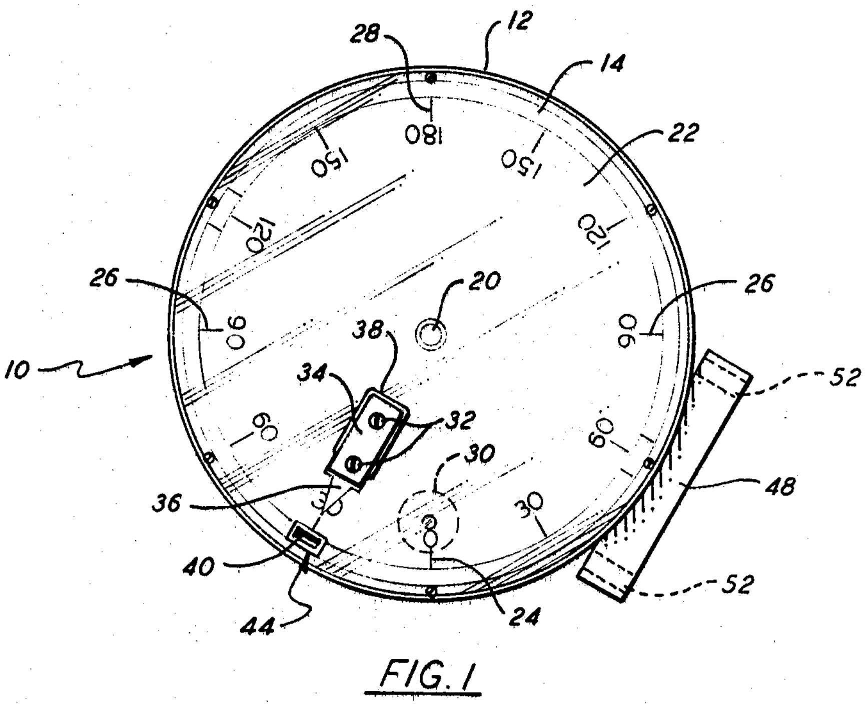
FIG. 1 is a front elevational view of the device of the invention.
Figure 2:
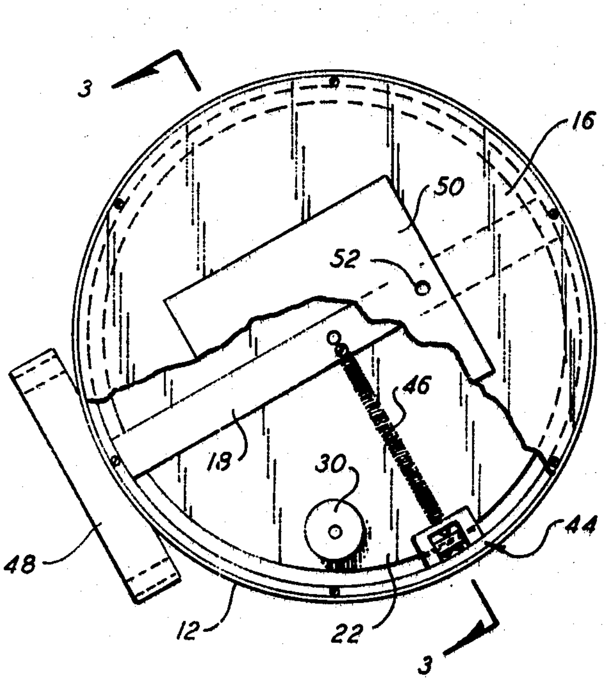
FIG. 2 is a rear elevational view of the device with a portion broken away.
Figure 3:
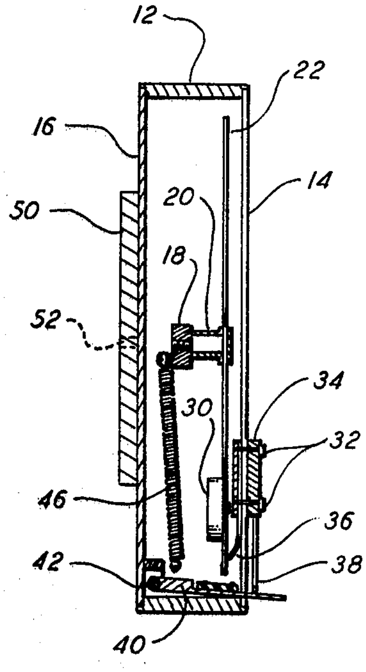
FIG. 3 is a side elevational view in section on the line 3—3 of FIG. 2.
Figure 4:
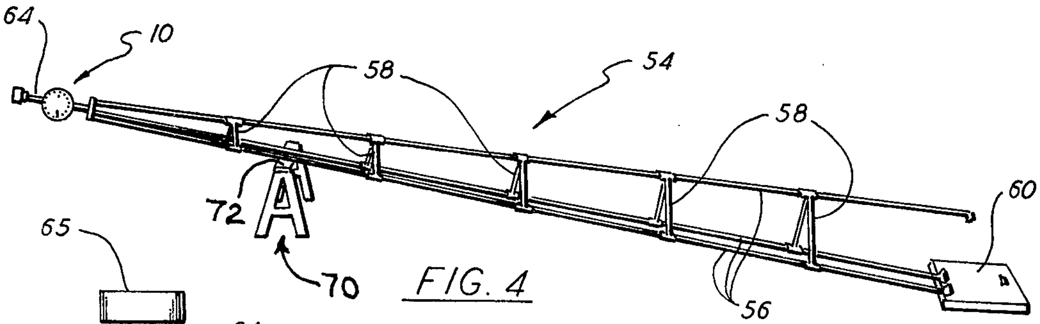
FIG. 4 is a perspective view of a runway approach light tower in a lowered position with the device of the invention attached near the top of the tower.

Referring now to FIGS. 1–3, a gravity-operated angle measuring device, denoted generally by reference numeral 10, includes a housing made up of cylindrical member 12, covered on the front by wall 14 of rigid, transparent material such as plastic or glass, and on the rear by metal plate 16. Support bar 18 extends across the interior of the housing and is affixed at each end to member 12. Pin 20 extends from bar 18 toward front wall 14 at the geometric center of the housing.

Circular disc 22 is supported at its center for free rotation upon pin 20. The side of disc 22 facing transparent wall 14 has a printed scale about its periphery, calibrated in degrees with zero point 24 on one side, progressing upwardly in both directions to two 90° points 26 and 180° point 28 opposite the zero point. Weight 30 is attached to disc 22 concentrically about a line from the center through zero point 24. Thus, whenever device 10 is arranged with disc 22 in an approximately vertical plane, weight 30 will cause the disc to rotate about its center until zero point 24 is on a vertical line through the center of disc 22.

Screws 22 pass through front wall 14, securing block 34 to the outside and pointer 36 to the inside thereof. The tip of pointer 36 is spaced slightly from disc 22 so as not to interfere with free rotation thereof, and positioned immediately in front of the printed scale. U-shaped element 38 is pivotally mounted on block 34 for selective movement between the positions shown in FIGS. 1 and 3.

Arm 40 is pivoted on pin 42 within the housing and extends through opening 44 in front wall 14 to a free end outside the housing. Spring 46 is attached at one end to bar 18 and at the other to arm 40, biasing the latter toward movement into engagement with the periphery of disc 22. Arm 40 serves as a friction brake, preventing gravitational rotation of disc 22 when in contact therewith. Element 38 is so dimensioned that when pivoted to the position of FIG. 3 it contacts and holds arm 40 away from disc 22. Thus, arm 40 serves as a brake only when element 38 is moved away from contact therewith.

Device 10 is provided with two mounting means 48 and 50, each comprising blocks affixed to the housing, with tapped holes 52 for mounting screws. The surfaces of blocks 48 and 50 which abut a surface of an object upon which device 10 mounted are perpendicular to one another and both are parallel to a line extending through the tip of pointer 36 and the center of device 10.

Turning now to FIGS. 4–11, the steps involved in a first embodiment of the method of the present invention are illustrated. Tower 54, typical of the type of supporting structure used to position runway approach lights at a desired altitude, is formed from tubular aluminum and includes three legs 56 connected at several points by cross members 58. The lower end of each of legs 56 include openings or other conventional fittings by which they may be bolted to supports anchored in concrete pad 60. Legs 56 converge toward their upper ends, which are connected by fittings 62 (FIG. 5) having clamp 63 to hold post 64, extending upwardly therefrom. The upper end of post 64 is provided with mounting head 65 for fitting 66, adjustable about two axes as explained later, for single lighting fixture 68.

Figure 5:
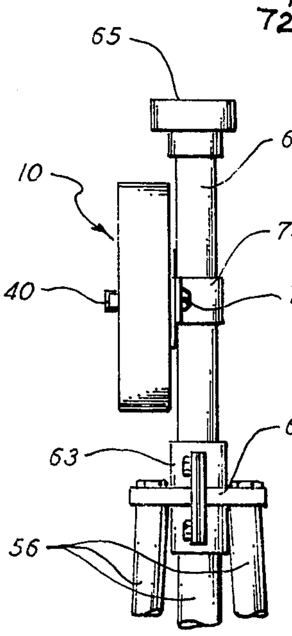
FIG. 5 is a fragmentary elevational view of the upper portion of the tower with the device attached.
Figure 6:
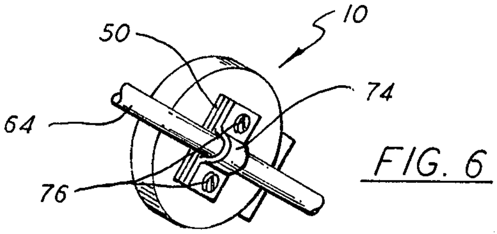
FIG. 6 is a fragmentary, perspective view, also showing the manner of attachment of the device to the tower member.
Figure 7:
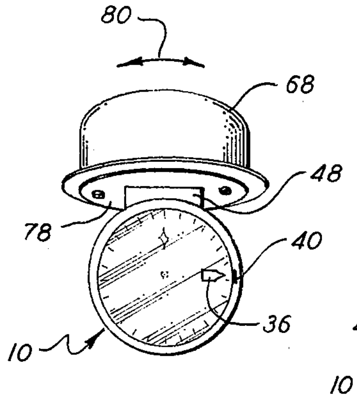
FIGS. 7–11 are a series of front and side elevational views illustrating the steps in using the device to adjust the angularity of a single light fixture mounted at the top of the tower.
Figure 8:
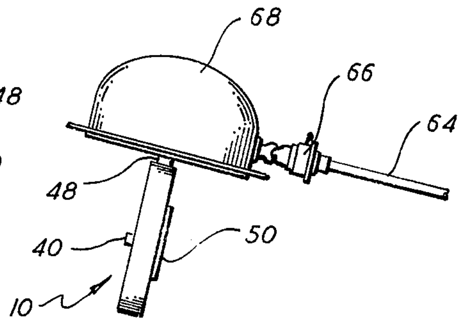

In practising the invention, tower 54 is first placed in a position which makes the upper end thereof accessible from ground level. The bolt holding one of legs 56 is removed and the other bolts loosened so that the tower may be rotated about a substantially horizontal axis through the lower ends of the legs which remain attached. Any convenient support 70 is used to hold tower 54 at an angle of repose, insuring that surface 72 thereof, upon which the two legs 56 rest, is horizontal. The angle of repose of tower 54, i.e., the vertical angle of the axis of post 64, which is assumed to reflect the major axis of the tower, is measured by attaching device 10, or a similar gravity-operated angle measuring device, to post 64. As shown in FIGS. 5 and 6, device 10 is attached by placing mounting block 50 against post 64 with tapped holes 52 on opposite sides thereof. Strap 74 closely engages post 64 and is secured to device 10 by screws 76 which are threaded in tapped holes 52. With element 38 positioned to hold arm 40 out of engagement with disc 22, zero point 24 will be the lowermost point on the scale, and the scale reading adjacent pointer 36 will accurately reflect the vertical angle of repose of tower 54. After the angle of repose has been noted, device 10 is removed from post 64 and attached to lighting fixture 68 by removing the usual lens and replacing it with plate 78, having appropriately spaced openings through which screws may be inserted and threaded into tapped holes 52 in mounting block 48.

The azimuth or horizontal angle of the lighting fixture relative to the fall line (i.e., the vertical plane defined by movement of the axis of post 64 as tower 54 is raised and lowered) is first adjusted. Device 10 is attached to plate 78 with the line through tapped holes 52 in mounting block 48 perpendicular to the axis of post 64 and parallel to the axis of the beam emanating from the bulb held by fixture 68. In this orientation, illustrated in FIGS. 7 and 8, a line through the center and pointer 36 is approximately horizontal. Fixture 68 may be rotated about the axis of post 64, in the directions indicated in FIG. 7 by arrows 80, by means of a slip fitting which may be locked by a set screw, all comprising a portion of fitting 66. If the fall line is parallel to the flight path of aircraft approaching the runway for which the light is provided, fixture 68 is rotated as required to produce a scale reading of 90° adjacent pointer 36 on device 10. If the fall line is other than parallel to the flight path, fixture 68 is rotated in a direction and through an angle differing from 90° by the angle of displacement of the fall line from the flight path. Thus, when tower 54 is erected, fixture 68 and therefore the light beam will be set at the proper azimuth. Although the azimuth is a horizontal angle when tower 54 is erected, since the adjustment is made with the tower in its position of repose, it may be measured by device 10 as a vertical angle.

Figure 9:
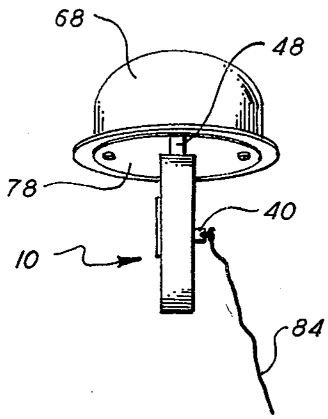
Figure 10:
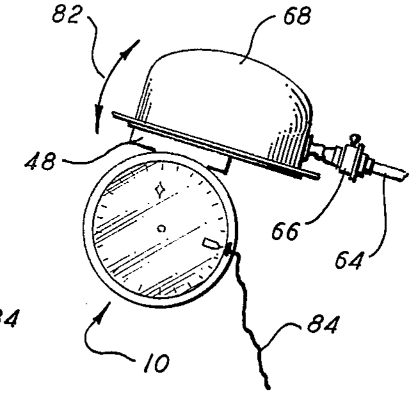
Figure 11:
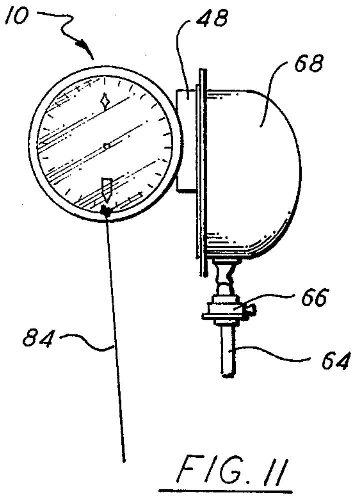
Figure 12:
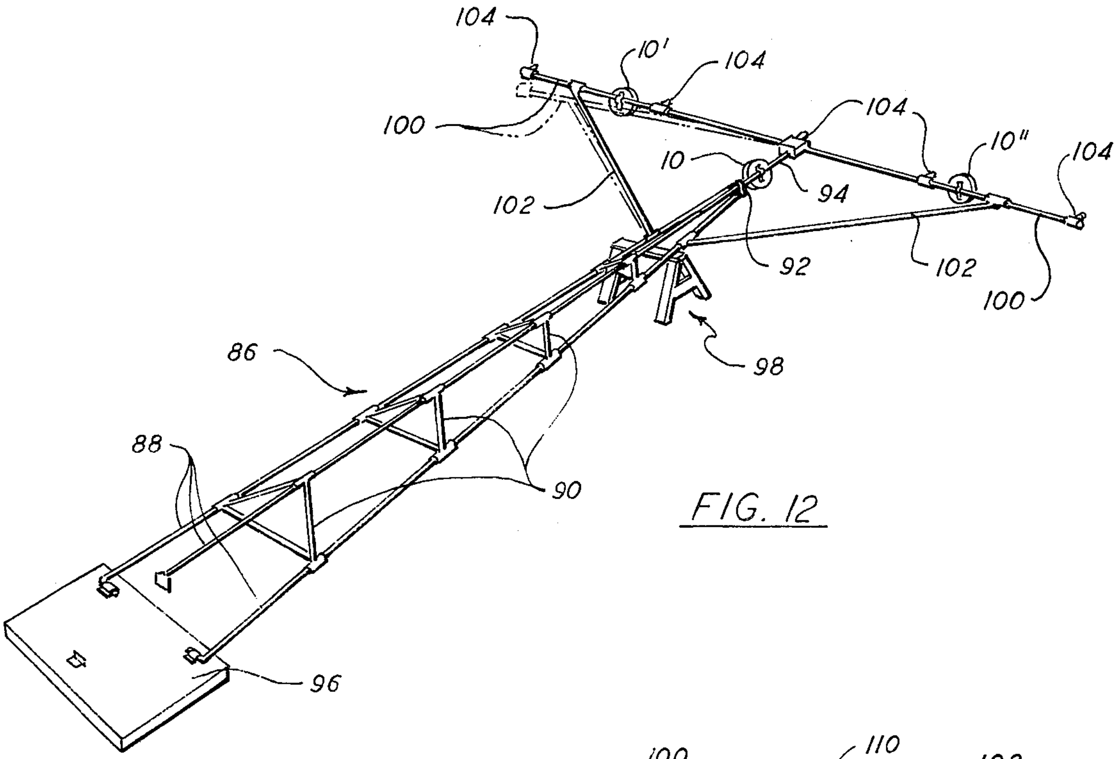
FIG. 12 is a perspective view of a tower for supporting multiple lighting fixtures in a lowered position with the angle measuring device shown attached at three different positions.
Figure 13:
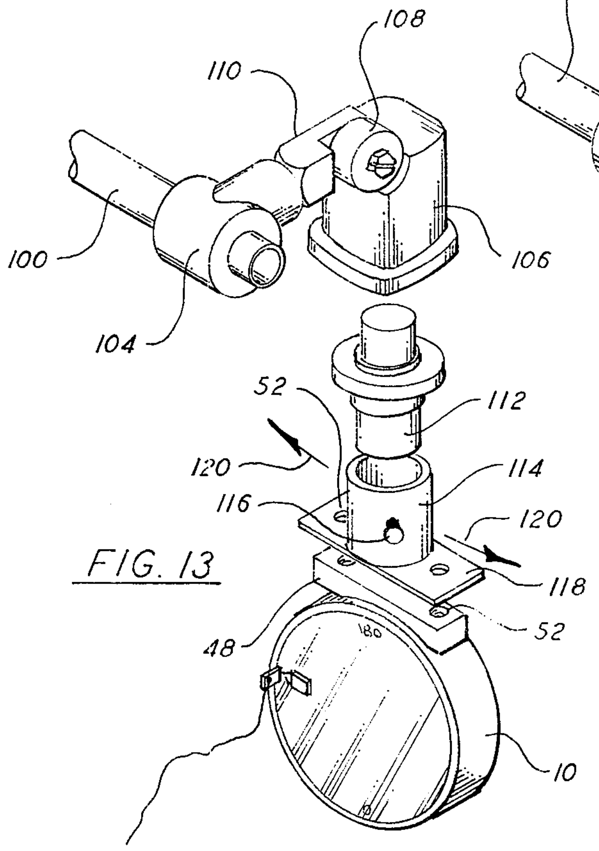
FIGS. 13 and 14 are fragmentary, exploded perspective views illustrating the use of the device in adjusting light fixtures of the type carried by the tower of FIG. 12.

The angle of elevation of the light beam is then adjusted by attaching device 10 to fixture 68 with the line through tapped holes 52 of mounting block 48 parallel, rather than perpendicular to the fall line, while still being perpendicular to the axis of the light beam. This position is illustrated in FIGS. 9–11. The elevational angle may be adjusted by movement of fixture 68 about an axis through a conventional clevis forming a part of fitting 66, in the directions of arrow 82. With tower 54 in the position of repose, fixture 68 is adjusted to the desired angle of elevation relative to the axis of post 64, assuming the latter to be exactly vertical when tower 54 is in the elevated position. That is, the sum of the desired angle of elevation and the previously noted angle of repose of the tower is subtracted from 90° and fixture 68 is rotated in the required direction of arrows 82 to produce this scale reading adjacent pointer 36 on device 10.

Flexible cord 84 is attached to the end of arm 40 extending outside the housing of device 10, and element 38 is rotated out of contact with arm 40 to allow the latter to be biased into engagement with the periphery of disc 22. Tower 54 is then erected and the bolt loosely replaced through the lower end of the previously detached leg 56. Cord 84, of sufficient length to be reached from ground level when the tower is erected, is then pulled to release arm 40 from locking engagement with the disc 22. When the disc has come to an equilibrium position, cord 84 is released, thereby locking the position of disc 22, and tower 54 is again lowered to the position of disc 22, and tower 54 is again lowered to the position of repose shown in FIG. 4. The reading on the scale of disc 22 adjacent pointer 36 is noted. If the reading differs from the desired angle of elevation, the required final adjustment of the position of fixtures 68 is made in the manner previously described. That is, the difference between the actual and desired elevational angles is added to or subtracted from (depending on the directional difference) the previous setting, made when assuming the axis of post 64 to be vertical when the tower is elevated. Fixture 68 is rotated about the axis of the clevis of fitting 66 by the required number of degrees, as indicated on device 10. After making the final adjustment, and locking fitting 66 in position, device 10 and plate 78 are removed from fixture 68, and any required reassembly of the bulb and lens is made. Tower 54 may then be elevated and bolted in position with the axis of the beam of light emitted from fixture 68 at the proper azimuth and elevation.

FIGS. 12–15 illustrate the steps in adjusting the angles of multiple light fixtures supported on a cross-bar at the top of a tower. Tower 86 is of essentially the same construction as tower 54, including legs 88, connected by cross members 90, and fitting 92 connecting the upper ends of the legs and supporting post 94. In the normal operating position, the lower ends of legs 88 are bolted to fittings anchored in concrete pad 96, and the bolt holding one leg is removed to rotate the tower to the lowered position shown in FIG. 12, resting on support 98. Cross bar 100 is supported at its center on the top of post 94 and stabilized by knee braces 102, secured by angular fittings to the cross bar and legs 88. Arm sockets 104 are permanently spaced points along the length thereof.

The angle of repose of tower 86 is determined by attaching the angle measuring device to post 94 in the position indicated by reference numeral 10, as described in connection with tower 54. The device is then attached to cross bar 100 in the positions indicated by reference numerals 10' and 10'' to insure that the cross bar is level and not bent as indicated in dotted lines at the left end. A reading of zero on device 10 in these positions indicates that the cross bar is level. Lamp holder 106 is connected by claims 108 to fitting 110 which is threaded in socket 104 and secured by a set screw, or the like, in a position wherein the axis of claims 108 is parallel to the axis of cross bar 100. One end of socket adapter 112 is threaded into the bulb socket of lamp holder 106, and tubular adapter 114 is secured by set screw 116 to the other end. Plate 118 is affixed to one end of adapter 114 and includes appropriately spaced opening for screws to enter tapped holes 52 in mounting block 48, securing device 10 to the adapter and thus to lamp holder 106.

If the fall line of tower 86 is other than parallel to the flight path, azimuth is adjusted by rotating the entire cross bar 100 about the axis of post 94, thereby angularly adjusting the axes of all lamp holders 106 simultaneously. Device 10 is attached by adapters 112 and 114 to lamp holder 106 in the position shown in FIG. 13. Cross bar 100 is then rotated in the required direction about its center, i.e., the axis of post 94, to move device 10 in the direction of one of arrows 120 until the reading on device 10 differs from 90° by the same number of degrees by which the fall line differs from the flight path. The fittings holding cross bar 100 and knee braces 102 are adjusted as required to maintain the cross bar in this position.

Figure 14:
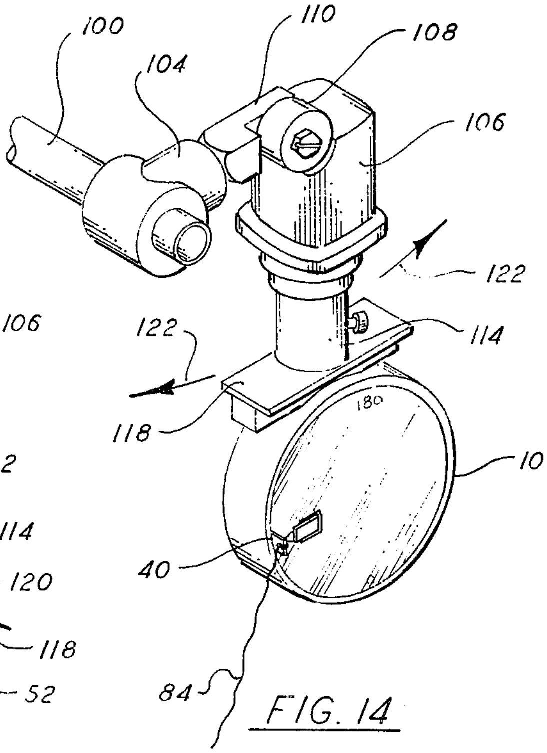

Set screw 116 is then loosened and tubular adapter is rotated 90° to place device 10 in the position shown in FIG. 14. Each of lamp holders 106 is set to the desired elevational angle relative to the axis of post 94 by loosening clevis 108, and rotating device 10 in the direction of arrows 122 until the reading corresponds to 90° less the sum of the previously noted angle to repose and desired elevational angle. The clevis of each lamp holder is tightened in this position.

With cord 84 attached to arm 40, and device 10 attached in the position of FIG. 14 to any one of lamp holders 106, tower 86 is erected. Cord 84 is pulled to release arm 40 from engagement with disc 22. When the disc has come to rest, cord 84 is released to lock the position of the disc relative to the housing and pointer 36. Tower 86 is again lowered to the original position of repose and the reading on device 10 is noted. If the reading differs from the desired angle of elevation, disc 22 is again placed in the free-wheeling mode by moving element 38 to hold arm 40 out of engagement with the disc. The reading on disc 22 adjacent pointer 36 is again noted, and clevis 108 is loosened to allow rotation of lamp holder 106 in the proper direction (of arrows 122) by the number of degrees by which the actual reading on device 10 in the elevated position of tower 84 differed from the desired elevation. The clevis is then tightened, and all lamp holders 106 are adjusted in the same manner and by the same amount.

From the foregoing, it is apparent that the invention is carried out with a simple device for measuring angles by arranging a weighted disc having a scale printed on its periphery in a substantially vertical plane for free rotation about its center relative to a fixed marker adjacent the scale. Although the angles are vertical angles in the position of the device when the measurement is taken, the surface or object to which the device is attached for taking the measurement may be reoriented so that the measured angle is horizontal. The method of the invention provides a convenient and accurate procedure for orienting the beams of either single or multiple runway approach lights, or the like, which are inaccessible from ground level in their normal operating positions.

What is claimed is:

1. A method of adjusting to a desired vertical angle the major axis of a lighting fixture rotatably mounted upon a rigid tower having an erected position wherein the lighting fixture is at a height inaccessible from ground level, said method comprising:

a. pivoting at least the portion of the tower carrying the lighting fixture about a horizontal axis to a position of repose wherein the fixture is accessible from ground level, and noting the vertical plane defined by the major axis during pivoting of the tower about said horizontal axis;
b. attaching a gravity-operated angle measuring device to said portion of the tower to measure the vertical angle of the major axis thereof when in said position of repose;
c. attaching said device to the fixture to measure the vertical angle of the major axis thereof with the tower in said position of repose;
d. rotating the fixture about an axis perpendicular to said plane and trough an angle which is the sum of the desired angle of elevation and the previously measured angle of repose of step (b) substracted from 90° as measured by said device;
e. pivoting the tower about said horizontal axis to its erected position, returning the fixture to the inaccessible height with said device attached thereto;
f. allowing said device to come to an equilibrium position, indicating the angle of elevation of said major axis of the fuxture with the tower in its erected position and locking said device in said equilibrium position by locking means controlled at ground level;
g. pivoting the tower about said horizontal axis back to its position of repose;
h. reading the angle locked on said device; and
i. rotating the fixture about said axis of adjustment of step (d) in a direction and by a number of degrees reflecting any difference between the desired vertical angle of said major axis of the fixture with the tower in its erected position and the angle locked on said device.

2. The invention according to claim 1 wherein said device is of the type having a braking member biased toward locking engagement with the gravity-responsive pendulum, and said locking step is performed by attaching a flexible cord to said braking member, manually pulling the cord to release said braking member from said locking engagement, and releasing the cord to allow said braking member to return to said locking engagement after a time period sufficient for said pendulum to reach substantial equilibrium.

3. The invention according to claim 1 wherein said substantially horizontal axis of adjustment is perpendicular to the longitudinal axis of the tower.

4. The invention according to claim 3 and including the further steps of attaching said device to the fixture with the tower in said position of repose to measure a second vertical angle thereof about an axis parallel with the longitudinal axis of the tower, and adjusting said second vertical angle to a desired value as indicated by said device.

5. The invention according to claim 4 wherein a plurality of fixtures are mounted on a bar extending transversely of the top of the tower, and including the further step of attaching said device to said bar first at a point to one side of the longitudinal axis of the tower and substantially spaced therefrom, and then at a point substantially spaced from said longitudinal axis on the opposite side, and adjusting the position of said bar as required to place the axis thereof in a horizontal plane.

6. The invention according to claim 5 wherein the longitudinal axis of the tower passes substantially through the center of said bar, and including the further step of attaching said device to said bar and rotating the latter about said longitudinal axis to a desired vertical angle.

* * * * *